(12) United States Patent
Ohshima

(10) Patent No.: US 8,407,748 B2
(45) Date of Patent: Mar. 26, 2013

(54) IMAGE PROCESSING APPARATUS, CONTROL METHOD THEREOF

(75) Inventor: Hideaki Ohshima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 12/869,587

(22) Filed: Aug. 26, 2010

(65) Prior Publication Data

US 2011/0050943 A1    Mar. 3, 2011

(30) Foreign Application Priority Data

Aug. 28, 2009  (JP) ................................ 2009-198415

(51) Int. Cl.
*H04N 7/173* (2006.01)
*H04N 5/228* (2006.01)
*H04N 5/222* (2006.01)
*H04N 5/76* (2006.01)

(52) U.S. Cl. ................ 725/105; 348/207.1; 348/333.01; 348/231.2

(58) Field of Classification Search ............. 348/207.99, 348/231.9
See application file for complete search history.

(56) References Cited

U.S. PATENT DOCUMENTS

| 7,265,780 B2 * | 9/2007 | Tanaka et al. ............ 348/207.99 |
| 2007/0244694 A1 * | 10/2007 | Hosokawa ....................... 704/10 |
| 2007/0280271 A1 * | 12/2007 | Maeda .......................... 370/400 |
| 2011/0004697 A1 * | 1/2011 | Tezuka ......................... 709/232 |

FOREIGN PATENT DOCUMENTS

| JP | 2009-038452 A | 2/2009 |
| WO | WO 2005022536 A2 * | 3/2005 |

* cited by examiner

*Primary Examiner* — Sinh Tran
*Assistant Examiner* — Selam Gebriel
(74) *Attorney, Agent, or Firm* — Carter, DeLuca, Farrell & Schmidt, LLP

(57) ABSTRACT

An image processing apparatus includes a reception unit configured to receive a transmission request of information on a directory for managing contents from a display apparatus, a transmission unit configured to transmit a response to the transmission request received by the reception unit, and a notification unit configured to notify the display apparatus of a change in a predetermined directory, thereby causing the display apparatus to transmit a transmission request of information on the predetermined directory again. When a new directory is formed on the same layer as that of the directory for managing the contents as a result of addition of the contents in the storage medium, the notification unit notifies the display apparatus of a change in a directory located on a layer above the directory for managing the contents.

17 Claims, 8 Drawing Sheets

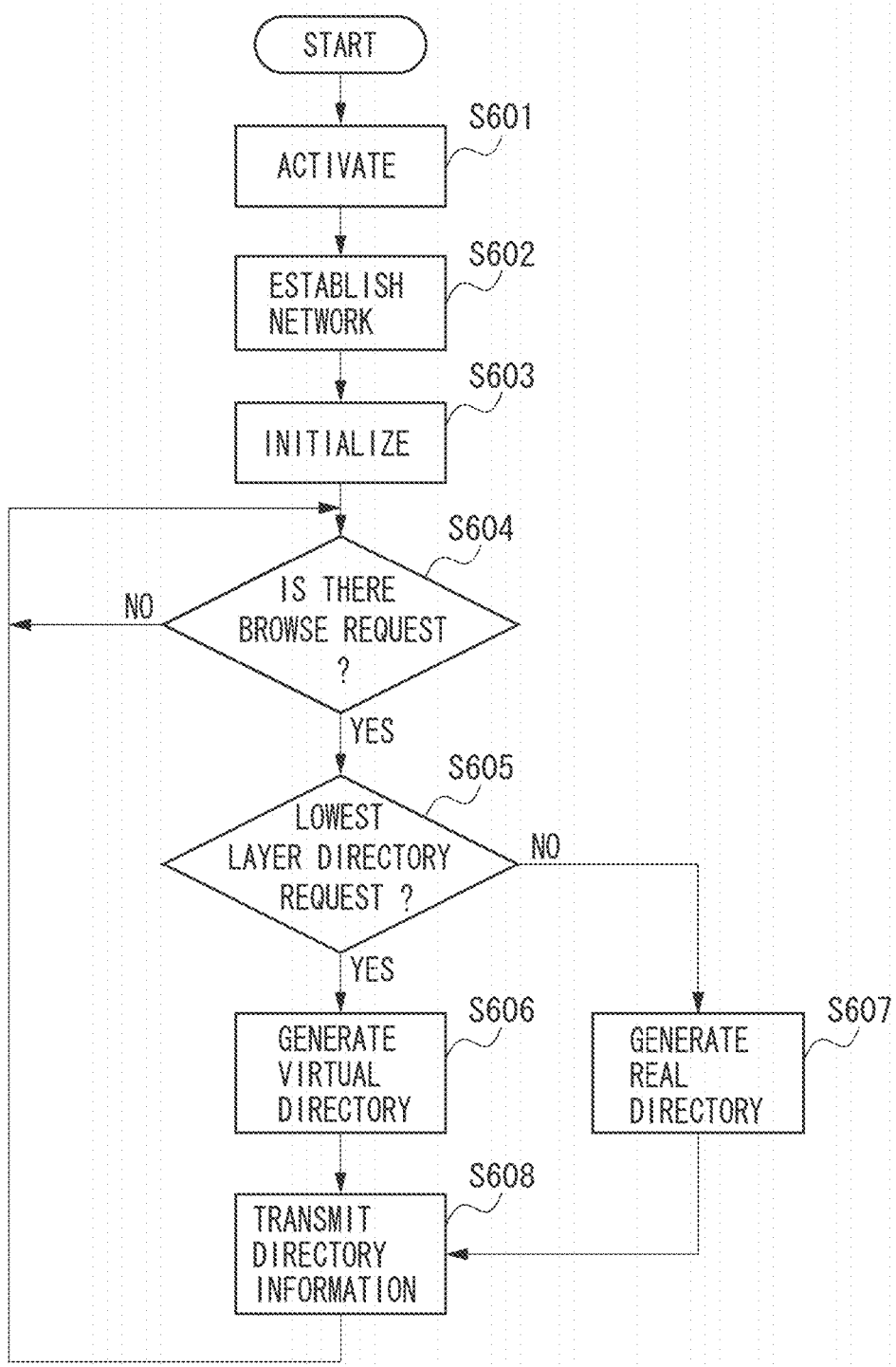

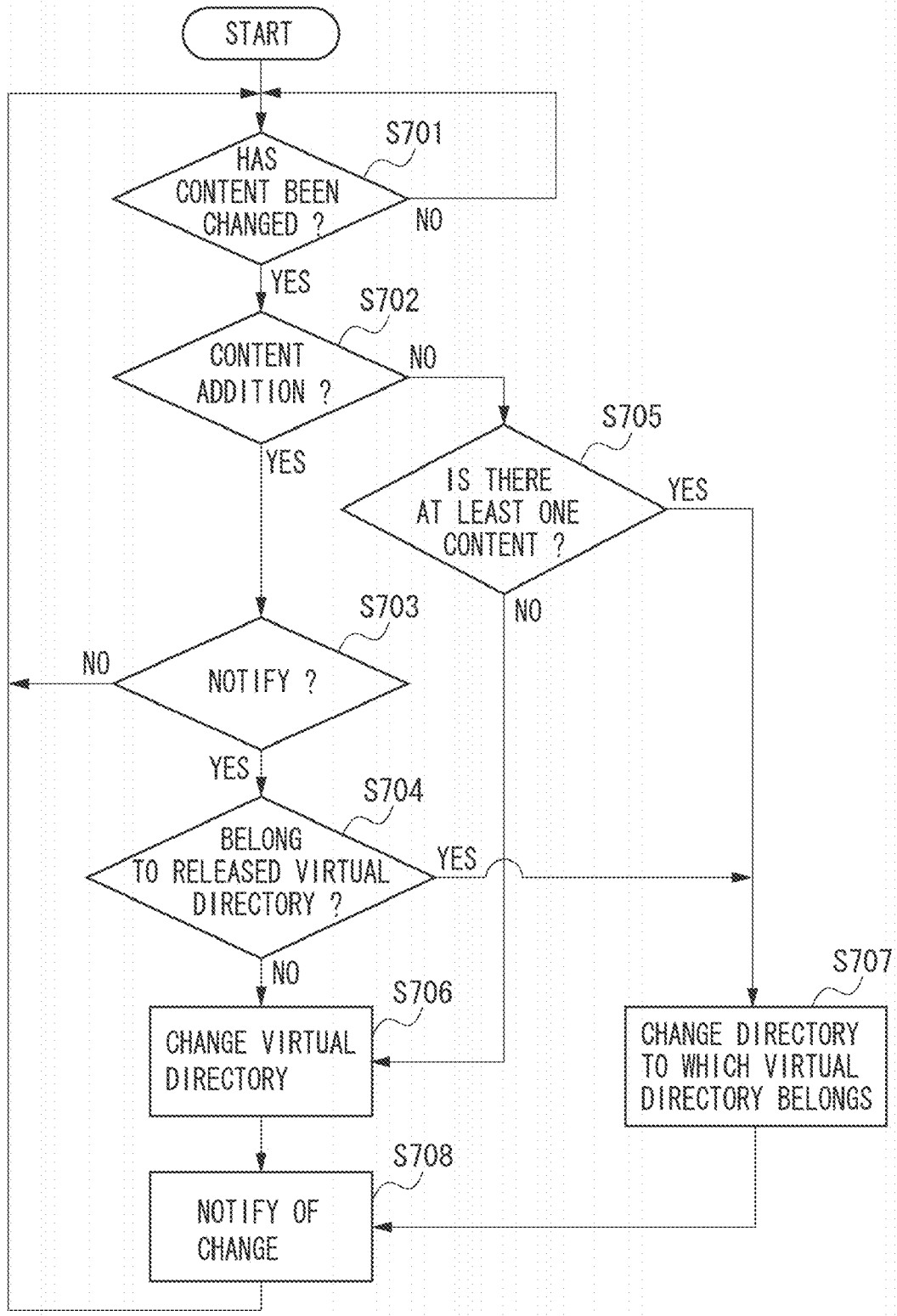

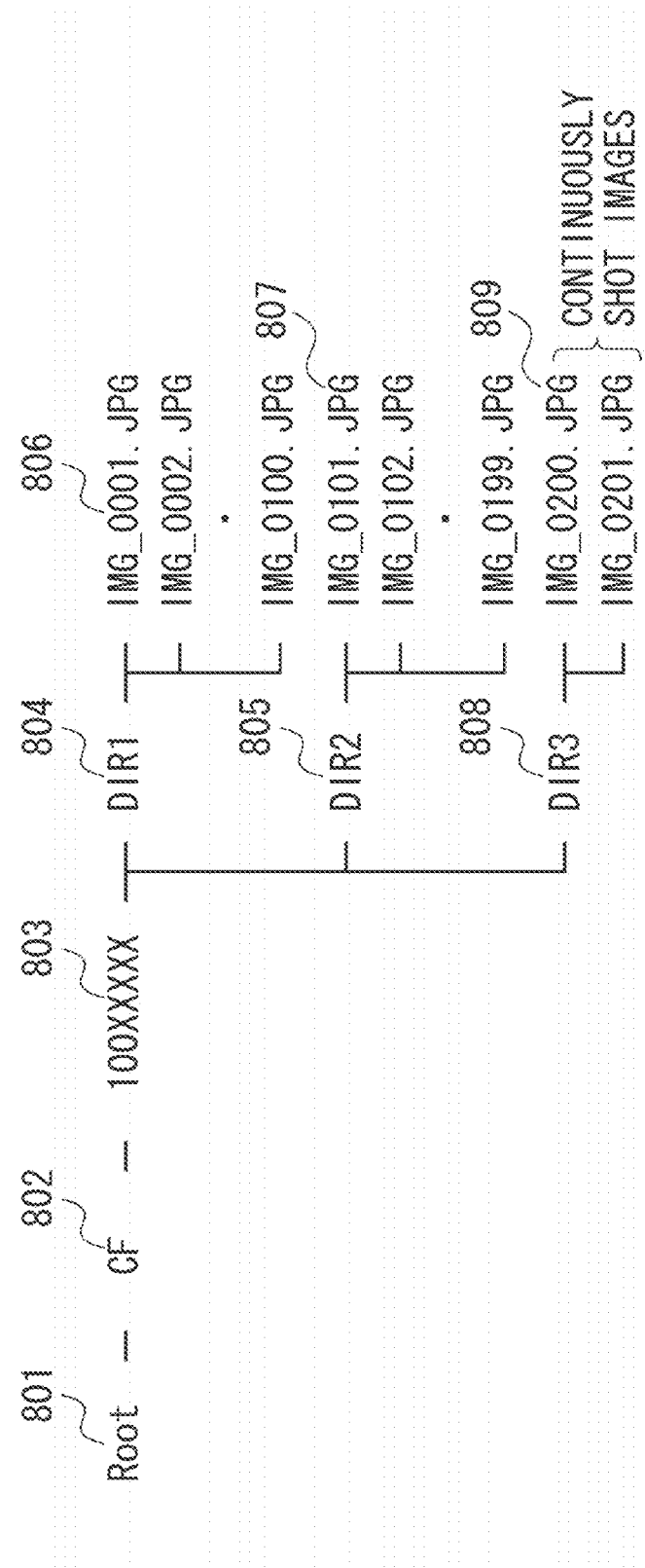

US 8,407,748 B2

IMAGE PROCESSING APPARATUS, CONTROL METHOD THEREOF

BACKGROUND OF THE INVENTION

1. Field of the Invention

The present invention generally relates to image processing and, more particularly, to a technology for performing transmission and control of images through a communication path.

2. Description of the Related Art

In recent years, there haven been defined and widespread guidelines for sharing digital contents such as still images, moving images, and audios among devices of different manufacturers in Digital Living Network Alliance (DLNA®). In the DLNA guidelines, a Digital Media Server (DMS) that provides digital contents and a Digital Media Player (DMP) that displays the digital contents are defined.

The digital contents are transferred between the DMS and the DMP. The DMP can display the digital contents provided from the DMS. In this case, when there is a great volume of digital data on the DMS side, communication loads have become great because data is transferred between the DMS and the DMP in proportion to the amount of the digital data.

There is known a technique for reducing resources to be used when a list of digital data is released through a network. As an example, Japanese Patent Application Laid-Open No. 2009-38452 discusses a technique that classifies digital contents while maintaining a hierarchical structure, and can release a list so as to set the number of digital contents equal to or less than a predetermined number according to the classification.

However, the technique discussed in Japanese Patent Application Laid-Open No. 2009-38452 gives no consideration to a case where contents are newly changed after the list of the classified content data has been released to an external display apparatus.

SUMMARY OF THE INVENTION

According to an aspect of the present invention, an image processing apparatus capable of transmitting contents stored in a storage medium in response to a request from a display apparatus includes a reception unit configured to receive a transmission request of information on a directory for managing the contents from the display apparatus, a transmission unit configured to transmit a response to the transmission request received by the reception unit, and a notification unit configured to notify, when the contents stored in the storage medium are changed after the transmission of the response by the transmission unit, the display apparatus of a change in a predetermined directory, thereby causing the display apparatus to transmit a transmission request of information on the predetermined directory again, wherein when a new directory is formed on the same layer as that of the directory for managing the contents as a result of addition of the contents in the storage medium, the notification unit notifies the display apparatus of a change in a directory located on a layer above the directory for managing the contents.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a flowchart illustrating processing according to an exemplary embodiment of the present invention.

FIG. 7 is a flowchart illustrating processing according to an exemplary embodiment of the present invention.

FIG. 8 illustrates a directory structure according to an exemplary embodiment of the present invention.

DESCRIPTION OF THE EMBODIMENTS

Various exemplary embodiments, features, and aspects of the invention will be described in detail below with reference to the drawings.

(System Configuration)

Figure 1:
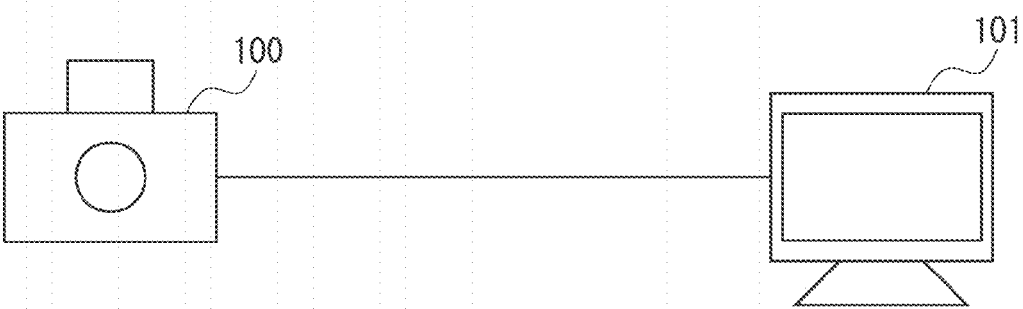
FIG. 1 illustrates a system configuration according to an exemplary embodiment of the present invention.

FIG. 1 illustrates an example of a communication system that includes an image processing apparatus and an external display apparatus according to an exemplary embodiment of the present invention. In the present exemplary embodiment, a digital camera 100 is used as an example of the image processing apparatus, and a Digital Television (DTV) 101 is used as the external display apparatus.

The digital camera 100 and the DTV 101 are connected to each other via a network that uses wired or wireless communication, and realizes a system for displaying contents stored in the digital camera 100 side on the DTV 101. In the present exemplary embodiment, the digital camera 100 can operate as a Digital Media Server (DMS) of the Digital Living Network Alliance (DLNA®), and the DTV 101 can operate according to specifications of a Digital Media Player (DMP) of the DLNA.

(Hardware Configuration)

Figure 2A:
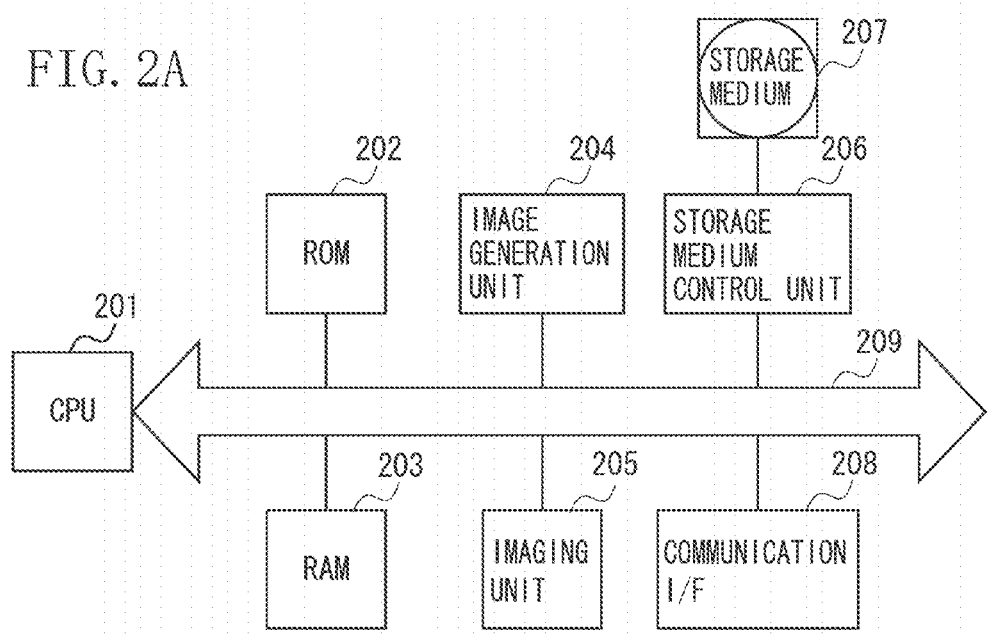
FIGS. 2A and 2B are block diagrams respectively illustrating a configuration of a digital camera and a configuration of a Digital Television (DTV) according to an exemplary embodiment of the present invention.

FIG. 2A is a block diagram illustrating a hardware configuration of the digital camera 100.

The digital camera 100 includes a system bus 209, and the following components connected to the system bus 209. A Central Processing Unit (CPU) 201 controls each unit of the digital camera 100 according to an input signal or a control program stored in a Read-Only Memory (ROM) 202.

The ROM 202 is a nonvolatile memory for storing the above control program. A Random Access Memory (RAM) 203 is a nonvolatile memory used as a work area when the CPU 201 executes the control program. The RAM 203 is used also as an area for temporarily buffering a captured image before it is stored in a storage medium 207.

An image generation unit 204 generates image data by performing image generation processing such as Joint Photographic Experts Group (JPEG) coding or Motion Picture Experts Group (MPEG) coding for a digital electric signal stored in the RAM 203 by an imaging unit 205. When executing editing of image processing of some kind or another for an image stored in the storage medium 207, the image generation unit 204 generates image data by performing image generation processing.

The imaging unit 205 includes a Charge-Coupled-Device (CCD) sensor and an Analog/Digital (A/D) converter, and converts light entered through an optical lens into a digital electric signal, and stores it in the RAM 203. A storage medium control unit 206 performs data transmission/reception with the storage medium 207 described below. The storage medium 207 is for storing image data. For example, Compact Flash® or a hard disk can be used. A communication interface (I/F) 208 is an interface for performing communication with the DTV 101. For example, a wireless Local Area Network (LAN), Ethernet®, or Bluetooth® can be used.

Figure 2B:
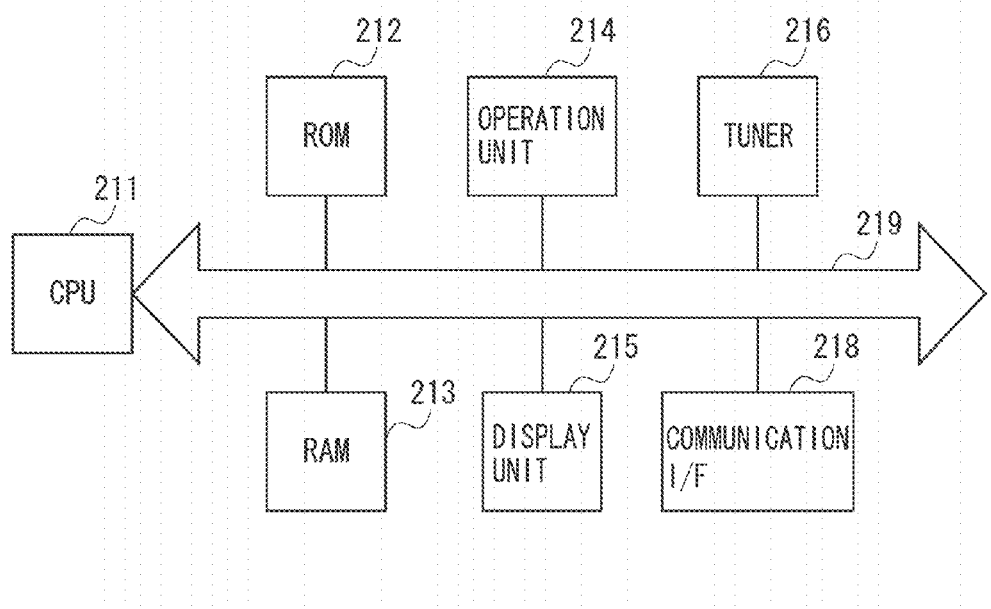

FIG. 2B is a block diagram illustrating a hardware configuration of the DTV 101.

A CPU 211, a ROM 212, a RAM 213, a communication I/F 218, and a system bus 219 are similar to those of FIG. 2A, and thus description thereof is omitted. An operation unit 214 receives user's operation to the DTV 101. For example, various buttons or a touch panel can be used. Needless to say, a reception unit of a remote control signal may be provided in the DTV 101 to control the DTV 101 according to a remote control operation. A display unit 215 is a display for displaying contents or various types of information. A tuner 216 processes signals from a broadcast station.

(Outline of General Content Display Processing)

Next, general processing of displaying contents such as image data stored in the storage medium 207 of the digital camera 100 on the display unit 215 of the DTV 101 will be described.

Figure 3:
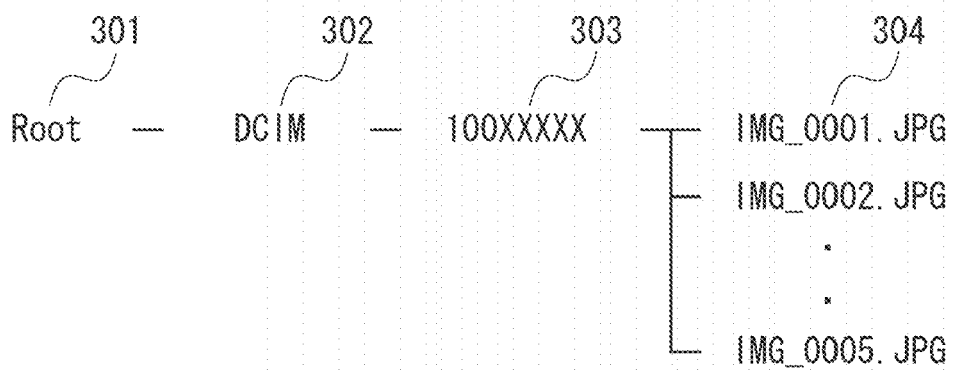
FIG. 3 illustrates a directory structure according to an exemplary embodiment of the present invention.

FIG. 3 illustrates an example of a directory structure stored in the storage medium 207 of the digital camera 100. The directory structure of the digital camera 100 complies with a Design rule for Camera File (DCF) system. In the storage medium 207, there is a first Root 301. There is a Digital Camera IMage (DCIM) directory 302 directly below the Root 301. Below the DCIM directory 302, there is a 100XXXXX directory 303. In the 100XXXXX directory 303, there are image files IMG_0001.JPG to IMG_0005.JPG 304 as contents.

The processing up to displaying of contents illustrated in FIG. 3 on the DTV 101 will be described. FIGS. 4A to 4F illustrate examples of screens displayed on the display unit 215 of the DTV 101.

Figure 4A:
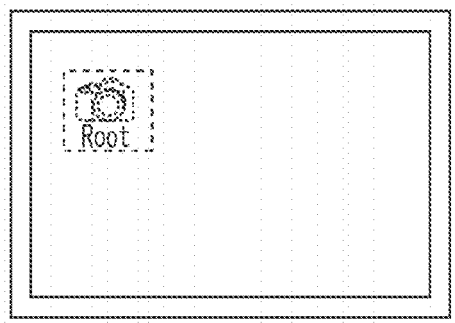
FIGS. 4A, 4B, 4C, 4D, 4E, and 4F illustrate display screens of the DTV according to an exemplary embodiment of the present invention.

After recognition of the digital camera 100, the DTV 101 displays a camera icon as illustrated in FIG. 4A. A dotted line means a "focus" indicating a target that is being selected.

When the camera icon is selected on the screen 501b by the user's operation, the DTV 101 issues a transmission request of information directly blow the Root to the digital camera 100. In response, the digital camera 100 transmits information directly below the Root to the DTV 101. More specifically, the DCIM directory 302 is present directly below the Root 301 in FIG. 3, and hence the digital camera 100 transmits information of the DCIM directory 302 to the DTV 101.

Figure 4B:
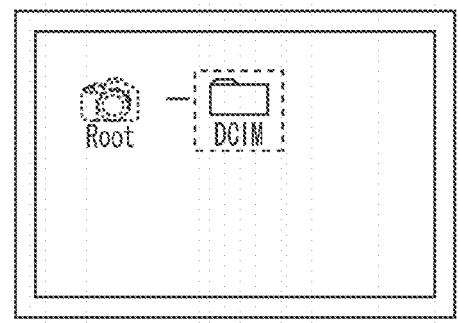

After reception of the information of the DCIM directory 302, the DTV 101 displays an icon indicating the DCIM directory as illustrated in FIG. 4B. When the icon indicating the DCIM directory is selected by the user's operation on the screen of FIG. 4B, the DTV 101 issues a transmission request of information below the DCIM directory to the digital camera 100. In response, the digital camera 100 transmits information below the DCIM directory 302, more specifically information of the 100XXXXX directory, to the DTV 101.

Figure 4C:
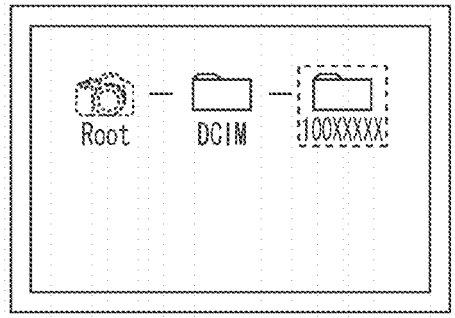

After reception of the information of the 100XXXXX directory, the DTV 100 displays an icon indicating the 100XXXXX directory as illustrated in FIG. 4C.

When the icon indicating the 100XXXXX directory is selected on the screen of FIG. 4C by the user's operation, the DTV 101 issues a transmission request of information below the 100XXXXX directory to the digital camera 100. In response, the digital camera 100 transmits information below the 100XXXXX directory 303, more specifically information of the image files IMG_0001.JPG to IMG_0005.JPG 304, to the DTV 101 to the DTV 101. The information transmitted in this case may be, for example, a file name or a thumbnail contained in the image file.

Figure 4D:
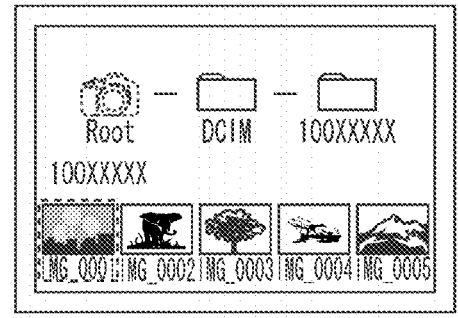

After reception of the information of the image files IMG_0001.JPG to IMG_0005.JPG 304, the DTV 101 displays a list of received thumbnails as illustrated in FIG. 4D.

When the image file IMG_0001 is selected on the screen of FIG. 4D by the user's operation, the DTV 101 issues a content acquisition request of the image file IMG_0001 to the digital camera 100. In response, the digital camera 100 reads a main body of the image file IMG_0001.JPG, which is a requested content from the storage medium 207, to transmit it to the DTV 101.

Figure 4E:
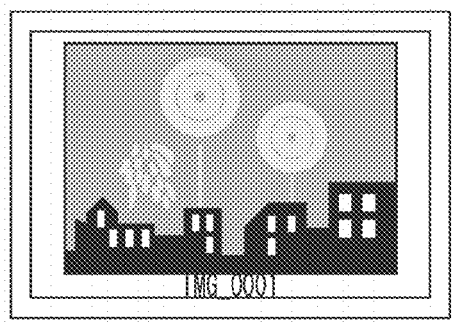

After reception of the image file IMG_0001.JPG, the DTV 101 displays the image file IMG_0001.JPG as illustrated in FIG. 4E.

Thus, the DTV 101 makes inquiries about information of contents to the digital camera by sequentially tracing up the layers from the Root. By transmitting information in response to the inquiries, the digital camera 100 can release information on contents stored in its own storage medium 207. The DTV 101 can recognize and receive contents of the digital camera 100 side based on the released information.

(Classification and Releasing of Content)

The outline of the general content display processing in the DLNA has been described. Hereinafter, characteristic processing of the present exemplary embodiment is described. A case where many contents are stored in the digital camera side 100 will be described.

Figure 5A:
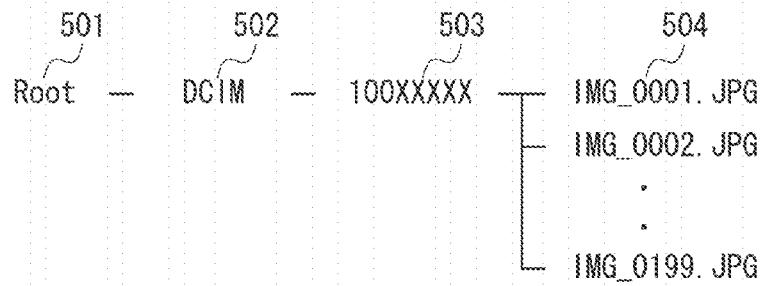
FIGS. 5A, 5B, and 5C illustrate directory structures according to an exemplary embodiment of the present invention.

FIG. 5A illustrates an example of a directory structure stored in the storage medium 207 of the digital camera 100. A difference from the directory structure illustrated in FIG. 3 is the number of contents in a 100XXXXX directory 503. In the example of FIG. 5A, there are 199 contents from IMG_0001.JPG to IMG_0199.JPG 504.

In the present exemplary embodiment, the digital camera 100 releases a virtual directory structure to the DTV 101 without directly releasing the directory structure to the DTV 101. This arrangement will be described below in detail.

Figure 5B:
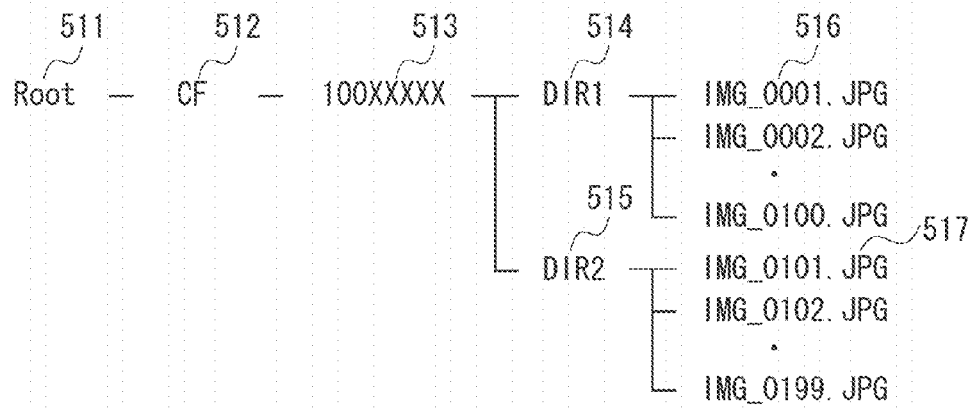

FIG. 5B illustrates a directory structure released by the digital camera 100 having the directory structure of FIG. 5A in the storage medium 207 to the DTV 101.

When information directly below a Root 511 is requested from the DTV 101, the digital camera 100 transmits information of the storage medium 207 managed by its own machine. For example, if the storage medium 207 is a Compact Flash®, the digital camera 100 transmits information regarding a "CF" directory 512. When the digital camera 100 manages a plurality of storage media, a plurality of directories are released directly below the Root 511 (e.g., "SD" directory or "HDD" directory". As a result, a user of the DTV 101 can check which of the storage media of the digital camera 100 should be selected to refer to a content stored therein.

When information below the CF directory 512 is requested from the DTV 101, the digital camera 100 transmits information of not a DCIM directory 502 but a 100XXXXX directory 503. It is because in the DCF system, among the directories directly below the Root 511, only the DCIM directory 502 can be processed by the digital camera 100. More specifically, in the layer of the DCIM directory 502, there is neither directory nor content that can be processed other than the DCIM directory 502.

Thus, the digital camera 100 transmits, without releasing the DCIM directory 502 to the DTV 101, information of the 100XXXXX directory 503 below the DCIM directory 502 to the DTV 101. As a result, as in the case of the example of FIG. 5B, the DTV 101 recognizes that there is a 100XXXXX directory 513 below the CF directory 512.

Thus, a simple directory structure can be displayed to the user by omitting unnecessary layers, and hence convenience for user can be improved.

Next, a case where information below the 100XXXXX directory 513 is requested from the DTV 101 will be described. In this case, information transmitted by the digital camera 100 varies depending on the number of contents. In the present exemplary embodiment, the digital camera 100 releases data not in such a manner that there is a content directly below the 100XXXXX directory 513 but in such a manner that there are folders each storing 100 contents directly below the 100XXXXX directory 513.

For example, in FIG. 5A, there are 199 contents (IMG_0001.JPG to IMG_0199.JPG) directly below the 100XXXXX directory 503. In this case, the digital camera 100 releases data in such a manner that there is a DIR1 directory 514 storing the IMG_0001.JPG to the IMG_0100.JPG and a DIR2 directory 515 storing the IMG_0101.JPG to the IMG_0199.JPG. More specifically, when information below the 100XXXXX directory 513 is requested from the DTV 101, the digital camera 100 transmits information of the DIR1 directory 514 and the DIR2 directory 515 to the DTV 101.

Figure 4F:
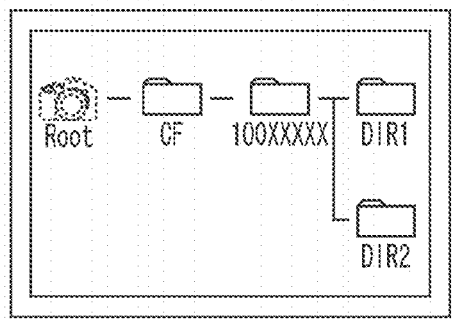

FIG. 4F illustrates a screen displaying the information of the DIR1 directory 514 and the DIR2 directory 515 received by the DTV 101. The DIR1 directory 514 and the DIR2 directory 515 are, as described above, virtual folders not actually present in the storage medium 207 of the digital camera 100.

When information below the DIR1 directory 514 is requested, the digital camera 100 transmits information of the IMG_0001.JPG to the IMG_0100.JPG. When information below the DIR2 directory 515 is requested, the digital camera 100 transmits information of the IMG_0101.JPG to the IMG_0199.JPG.

For a classification method of the DIR1 and the DIR2, a file number, a date, and similar photographing conditions may be used. By performing such processing, a great volume of contents is not displayed on the DTV 101 at one time. As a result, the user can search for desired contents more easily.

Referring to a flowchart of FIG. 6, the above processing will be described. The CPU 201 of the digital camera 100 realizes processing of each of FIGS. 6 and 7 by controlling each unit of the digital camera 100 according to a program.

In step S601, the digital camera 100 is activated by the user's operation.

In step S602, when communication with the DTV 101 is instructed by the user's operation, the digital camera 100 establishes a network by using the communication I/F 208. For establishing the network, the digital camera 100 must set necessary items such as its own IP address. After setting the necessary items, a network structure is established for the digital camera 100 based on a protocol, such as Transmission Control Protocol/Internet Protocol (TCP/IP).

In step S603, the digital camera 100 performs initialization as a content providing server. In the present exemplary embodiment, the digital camera 100 operates as a DMS in the DLNA. In step S604, the digital camera 100 determines whether a Browse request has been received from the DTV 101. If the Browse request is determined to have been received (YES in step S604), the processing proceeds to step S605. If the Browse request is determined not to have been received (NO in step S604), the digital camera 100 stands by until the request is received.

In step S605, the digital camera 101 determines to which of directories the Browse request from the DTV 101 is. If the request is for a directory of a lowest layer among directories managed by itself, more specifically the 100XXXXX directory 503 in FIG. 5A (YES in step S605), the processing proceeds to step S606. If not (NO in step S605), the processing proceeds to step S607.

In step S606, the digital camera 100 generates virtual directory information where contents in the directory of the lowest layer are further classified by a predetermined classification method. More specifically, in the example of FIG. 5B, information of the DIR1 directory 514 and the DIR2 directory 515 is generated. In step S607, the digital camera 100 generates information of a directory directly below a designated directory.

In step S608, the digital camera 100 transmits the directory information generated in step S606 or S607 to the DTV 101 via the communication I/F 208, and the processing returns to step S604. When information below the virtual directory is requested, the digital camera 100 transmits only information of a content virtually managed by the virtual directory as illustrated in FIG. 5B, to the DTV 101.

(Processing for Change in Content)

Next, a case where a change occurs in contents of the digital camera 100 side after the digital camera 100 has released the directory structure and the contents to the DTV 101 will be described. An example where, after transmission of information on the directory structure and the contents, the digital camera 100 performs shooting, and the number of contents stored in the storage medium 207 increases will be described.

After one shooting operation of the digital camera 100, data is stored in the storage medium 207, and a content IMG_0200.JPG is added to the contents 504 of FIG. 5A. In this case, the digital camera 100 transmits to the DTV 101 a change notification indicating a change in content of the DIR2 directory 515.

Based on the change notification, the DTV 101 recognizes the change in content of the DIR2 directory 515, and requests information below the DIR2 directory 515 again. In response, the digital camera 100 transmits information of the contents IMG_0101.JPG to IMG_0200.JPG. In this way, the change in content of the digital camera 100 side is reflected on the DTV 101 side.

Figure 5C:
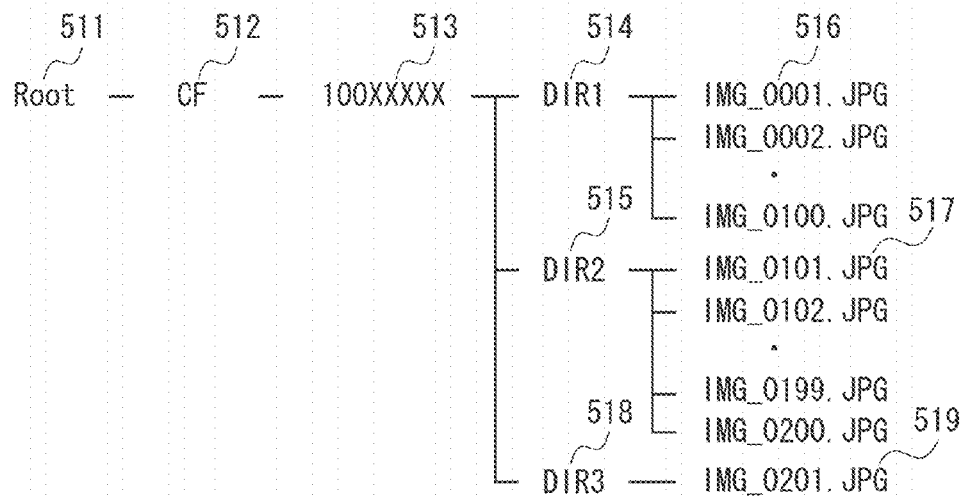

Next, a case where the digital camera 100 performs continuous shooting, and two contents IMG_0200.JPG and IMG_0201.JPG are added to the contents 504 will be described. In this case, the digital camera notifies of addition of two new contents. However, data must be released in such a manner that not only the content of the DIR2 directory 514 is changed but also a new DIR3 directory 518 is added as illustrated in FIG. 5C, and there is a content IMG_0201.JPG directly below the DIR3 directory 518. More specifically, as a result of an increase in content, the directory structure released to the DTV 101 is also changed.

Thus, in this case, the digital camera 100 transmits to the DTV 101 a change notification of not below the DIR2 directory 515 but below the 100XXXXX directory 513 that is a layer directly above the DIR2 directory 515.

The DTV 101 that has received the change notification requests information below the 100XXXXX directory 513. The digital camera 100 transmits to the DTV 101 information of the DIR1 directory 514, the DIR2 directory 515, and the DIR3 directory 518. In this way, according to a change in content of the digital camera 100 side, the directory structure released to the DTV 101 can be appropriately released.

Hereinafter, referring to a flowchart of FIG. 7, the above processing is described. Before a start of the processing, the directory structure illustrated in FIG. 5B is released from the digital camera 100 to the DTV 101.

In step S701, the digital camera 100 determines whether a change has occurred in content stored in the storage medium 207. An example of a change in content may be a case where the digital camera 100 performs shooting or a case where a content is deleted from the storage medium 207. If it is determined that a change has occurred in content (YES In step S701), the processing proceeds to step S702. If it is determined that no change has occurred (NO in step S701), the processing stands by until the content is changed.

In step S702, the digital camera 100 determines whether the change in content is content addition. If it is determined that the change is content addition (YES in step S702), the processing proceeds to step S703. If it is determined that the change is not content addition (NO in step S702), the processing proceeds to step S705.

In step S703, the digital camera 100 determines whether contents are continuously added, and whether to transmit a change notification to the DTV 101. An example of continuous addition of contents may be a case where the digital camera 100 executes continuous shooting or a case, such as bracket shooting, where a plurality of contents is generated by one shooting operation.

Even when the present exemplary embodiment is applied to an apparatus other than the digital camera, for example, there may be a case where an operation of copying a plurality of contents stored in another device in the storage medium 207 is performed or a case where a plurality of contents are received from another device. If the digital camera 100 determines that a change notification is transmitted (YES in step S703), the processing proceeds to step S704. If the digital camera 100 determines that no change notification is transmitted (NO in step S703), the processing returns to step S701.

In step S704, the digital camera 100 determines whether the added content belongs to a virtual directory that has been released. If the digital camera 100 determines that the added content belongs to the virtual directory (YES in step S704), the processing proceeds to step S706. If the digital camera 100 determines that the added content does not belong to the virtual directory (NO in step S704), the processing proceeds to step S707. If a plurality of contents has been added, determination of this step is "NO" if any one of the contents does not belong to the released virtual directory.

As specific processing, the determination can be made based on whether the number of contents of the released virtual directory including the added contents exceeds a predetermined number (100 in the example of FIG. 5B). For example, it can be determined that the added contents belong to the released virtual directory, if the number of contents of the released virtual directory including the added contents does not exceed the fixed predetermined number. It can also be determined that the added contents do not belong to the released virtual directory, if the number of contents of the released virtual directory including the added contents exceeds the fixed predetermined number.

In step S706, the digital camera 100 determines to transmit a change notification for, among the released virtual directories, the virtual directory to which the added contents belong.

In step S707, the digital camera 100 determines to transmit a change notification for a directory of a layer directly above to which the released virtual directory belongs. More specifically, in the example of FIG. 5B, the digital camera 100 determines to transmit the change notification for the 100XXXXX directory 513 that is a directory directly above the DIR2 directory 515.

Next, a case where it is determined that the change is not content addition (NO in step S702) will be described. In this case, the digital camera 100 determines that a content has been deleted. In step S705, the digital camera 100 determines whether there is still any content in the virtual directory to which the deleted content has belonged to even after the deletion. If there is a content (YES in step S705), the processing proceeds to step S707. If there is no content (NO in step S705), the processing proceeds to step S706.

In step S708, the digital camera 100 transmits the change notification determined in step S706 or S707 to the DTV 101. Thus, releasing of a new virtual directory caused by content addition, or releasing of a virtual directory that has become unnecessary by content deletion, more specifically, the virtual directory that does not store any content, can be cancelled.

As described above, according to the digital camera 100 in the present exemplary embodiment, a great amount of contents can be appropriately classified by using a virtual directory to be released to the DTV 101. Even when a change occurs in content after releasing, the change can be appropriately reflected on the virtual directory structure.

Hereinafter, a second exemplary embodiment is described. The present exemplary embodiment has much in common with the first exemplary embodiment. Thus, description of similar portions is omitted, and unique portions of the present exemplary embodiment will be described.

In the first exemplary embodiment, for example, a case where two images are captured by continuous shooting in the state of the directory structure illustrated in FIG. 5B is considered. In this case, of the two new contents added by shooting, the content IMG_0200.JPG is stored in the DIR2 directory 515 illustrated in FIG. 5C, and the content IMG_0201.JPG is stored in the DIR3 directory 519. However, the IMG_0200.JPG and the IMG_0201.JPG are contents acquired by the continuous shooting, and hence it is desired that they can be managed on the same directory.

Thus, in the present exemplary embodiment, contents associated with each other may be stored in the same virtual directory and released. More specifically, as illustrated in FIG. 8, when information below a DIR2 directory 805 is requested, contents IMG_0101.JPG to IMG_0199.JPG are transmitted. When information below a DIR3 directory 808 is requested, information of contents IMG_0200.JPG to IMG_0201.JPG may be transmitted.

The exemplary embodiments of the present invention have been described. However, the invention is not limited to those embodiments, and various changes and modifications can be made within the scope of the subject matter.

The present invention can be realized by executing the following processing. That is, software (program) for realizing the functions of the aforementioned exemplary embodiments is supplied to a system or an apparatus via a network or various computer-readable storage medium(s). A computer (CPU, micro-processing unit (MPU), and/or the like) of the system or the apparatus reads the program to execute it.

A computer-readable storage medium for supplying the program includes, for example, a flexible disk, a hard disk, an optical disk, a magneto-optical (MO) disk, a compact disk ROM (CD-ROM), a magnetic tape, a nonvolatile memory card, a ROM, and a digital versatile disk ROM (DVD-ROM).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-198415 filed Aug. 28, 2009, which is hereby incorporated by reference herein in its entirety.

What is claimed is:

1. An image processing apparatus capable of transmitting contents stored in a storage medium in response to a request from a display control apparatus, the image processing apparatus comprising:
a reception unit configured to receive a transmission request for information on a directory for managing the contents from the display control apparatus;
a transmission unit configured to transmit a response to the transmission request received by the reception unit; and
a notification unit configured to notify, when the contents stored in the storage medium are added or deleted after the transmission of the response by the transmission unit, the display control apparatus of a change in a predetermined directory, thereby causing the display control apparatus to transmit a transmission request for information on the predetermined directory again,
wherein, when a new directory is formed on the same layer as that of the directory for managing the contents as a result of addition of the contents in the storage medium, the notification unit notifies the display control apparatus of a change in a directory located on a layer above the directory for managing the contents.

2. The image processing apparatus according to claim 1, wherein, when the contents are continuously added, the notification unit transmits, after all the contents are added, the notification to the display control apparatus.

3. An image processing apparatus capable of transmitting contents stored in a storage medium in response to a request from a display control apparatus, the image processing apparatus comprising:
a reception unit configured to receive a transmission request for information on a directory for managing the contents from the display control apparatus;
a transmission unit configured to transmit a response to the transmission request received by the reception unit; and
a notification unit configured to notify, when the contents stored in the storage medium are added or deleted after the transmission of the response by the transmission unit, the display control apparatus of a change in a predetermined directory, thereby causing the display control apparatus to transmit a transmission request for information on the predetermined directory again,
wherein, when there is no more content in the directory for managing the contents as a result of deletion of the contents from the storage medium, the notification unit notifies the display control apparatus of a change in a directory located on a layer above the directory for managing the contents.

4. A method for controlling an image processing apparatus capable of transmitting contents stored in a storage medium in response to a request from a display control apparatus, the method comprising:
receiving a transmission request for information on a directory for managing the contents from the display control apparatus;
transmitting a response to the received transmission request;
notifying, when the contents stored in the storage medium are added or deleted after the transmission of the response, the display control apparatus of a change in a predetermined directory, thereby causing the display control apparatus to transmit a transmission request for information on the predetermined directory again; and
notifying, when a new directory is formed on the same layer as that of the directory for managing the contents as a result of addition of the contents in the storage medium, the display control apparatus a change in a directory located on a layer above the directory for managing the contents.

5. A method for controlling an image processing apparatus capable of transmitting contents stored in a storage medium in response to a request from a display control apparatus, the method comprising:
receiving a transmission request for information on a directory for managing the contents from the display control apparatus;
transmitting a response to the received transmission request;
notifying, when the contents stored in the storage medium are added or deleted after the transmission of the response, the display control apparatus of a change in a predetermined directory, thereby causing the display control apparatus to transmit a transmission request for information on the predetermined directory again; and
notifying, when there is no more content in the directory for managing the contents as a result of deletion of the contents from the storage medium, the display control apparatus of a change in a directory located on a layer above the directory for managing the contents.

6. A computer-readable storage medium containing computer-executable instructions for controlling an image processing apparatus capable of transmitting contents stored in the storage medium in response to a request from a display control apparatus, the medium comprising:
computer-executable instructions for receiving a transmission request for information on a directory for managing the contents from the display control apparatus;
computer-executable instructions for transmitting a response to the received transmission request;
computer-executable instructions for notifying, when the contents stored in the storage medium are added or deleted after the transmission of the response, the display control apparatus of a change in a predetermined directory, thereby causing the display control apparatus to transmit a transmission request for information on the predetermined directory again; and
computer-executable instructions for notifying, when a new directory is formed on the same layer as that of the directory for managing the contents as a result of addition of the contents in the storage medium, the display control apparatus of a change in a directory located on a layer above the directory for managing the contents.

7. A computer-readable storage medium containing computer-executable instructions for controlling an image processing apparatus capable of transmitting contents stored in the storage medium in response to a request from a display control apparatus, the medium comprising:

computer-executable instructions for receiving a transmission request for information on a directory for managing the contents from the display control apparatus;

computer-executable instructions for transmitting a response to the received transmission request;

computer-executable instructions for notifying, when the contents stored in the storage medium are added or deleted after the transmission of the response, the display control apparatus of a change in a predetermined directory, thereby causing the display control apparatus to transmit a transmission request for information on the predetermined directory again; and computer-executable instructions for notifying, when there is no more content in the directory for managing the contents as a result of deletion of the contents from the storage medium, the display control apparatus of a change in a directory located on a layer above the directory for managing the contents.

8. The image processing apparatus according to claim 1,
wherein the maximum number of contents managed by the directory is a predetermined number, and
wherein, when contents are added and the number of contents stored in the storage medium exceeds the predetermined number, the added contents are managed by a different directory.

9. The image processing apparatus according to claim 1, wherein the directory for managing the contents is a virtual directory configured to be released to the display control apparatus.

10. The image processing apparatus according to claim 1, wherein the contents are managed by a different directory based on at least one of a file number, a date and a similar photographing.

11. The image processing apparatus according to claim 1, wherein contents associated with each other are managed by a same directory.

12. The image processing apparatus according to claim 1, wherein a plurality of contents acquired by a continuous shooting is managed by a same directory.

13. The image processing apparatus according to claim 3,
wherein the maximum number of contents managed by the directory is a predetermined number, and
wherein, when contents are added and the number of contents stored in the storage medium exceeds the predetermined number, the added contents are managed by a different directory.

14. The image processing apparatus according to claim 3, wherein the directory for managing the contents is a virtual directory configured to be released to the display control apparatus.

15. The image processing apparatus according to claim 3, wherein the contents are managed by a different directory based on at least one of a file number, a date and a similar photographing.

16. The image processing apparatus according to claim 3, wherein contents associated with each other are managed by a same directory.

17. The image processing apparatus according to claim 1, wherein a plurality of contents acquired by a continuous shooting is managed by a same directory.

* * * * *